United States Patent [19]

Reade

[11] 4,187,115

[45] Feb. 5, 1980

[54] ANORTHITE GLASS-CERAMICS

[75] Inventor: Richard F. Reade, Corning, N.Y.

[73] Assignee: Corning Glass Works, Corning, N.Y.

[21] Appl. No.: 938,971

[22] Filed: Sep. 1, 1978

[51] Int. Cl.² .................................................. C03C 3/22
[52] U.S. Cl. ...................... 106/39.8; 65/33; 106/52; 106/53
[58] Field of Search .................. 106/39.8, 39.7, 39.6, 106/51

[56] References Cited

U.S. PATENT DOCUMENTS

| | | | |
|---|---|---|---|
| 2,920,971 | 1/1960 | Stookey | 106/39.8 |
| 3,677,728 | 7/1972 | Kitaigorodosky | 106/51 |
| 3,772,041 | 11/1973 | Tochon | 106/39.6 |
| 3,950,174 | 4/1976 | Suzuki et al. | 106/39.6 |

*Primary Examiner*—Helen M. McCarthy
*Attorney, Agent, or Firm*—Clinton S. Janes, Jr.

[57] ABSTRACT

The instant invention is related to the production of highly refractory glass-ceramic articles having moderate coefficients of thermal expansion in the $CaO-Al_2O_3-SiO_2-TiO_2$ field wherein anorthite comprises the predominant crystal phase with a minor amount of rutile also being present. The articles demonstrate very high D.C. volume resistivities and high dielectric constants with exceptionally low loss tangents and dielectric loss factors. Their refractoriness and moderate expansion suggests an application such as kiln furniture where high temperatures, but not severe temperature changes, are encountered. Their high D.C. resistivities and low A.C. dielectric losses suggest their utility as insulators and electronic substrate materials.

4 Claims, 2 Drawing Figures

ANORTHITE GLASS-CERAMICS

BACKGROUND OF THE INVENTION

Materials exhibiting high D.C. volume resistivity coupled with low A.C. dielectric losses, e.g., steatite, forsterite, and very high alumina-containing bodies, have found extensive use in such applications as electrical insulators and substrate materials. For the former application a very low loss tangent is demanded. The above-recited commercial materials are sintered ceramics with the disadvantageous characteristics inherent in such bodies as, e.g., porosity and surfaces which are not completely smooth. Moreover, the configurations of the products and the rate of production thereof are limited by the sintering technique of manufacture.

Glass-ceramic articles are prepared via the heat treatment of precursor glass bodies. Accordingly, glass-ceramics can be produced utilizing forming methods conventional in the glassmaking art, e.g., blowing, casting, drawing, pressing, rolling, etc. Furthermore, as is well recognized, glass articles have smooth surfaces and are non-porous.

U.S. Pat. No. 2,920,971 constitutes the basic disclosure in the field of glass-ceramics and reference is made to that patent for further discussion of the microstructure and properties thereof, as well as the manner in which such articles are prepared. In brief, however, glass-ceramics are produced in accordance with three general steps. First, a glass-forming composition, which customarily also contains a nucleating agent, is melted. Second, the melt is simultaneously cooled to a glass sufficiently quickly to prevent the occurrence of any substantial crystallization and an article of a desired geometry is shaped therefrom. Third, the glass is subjected to a heat treatment to cause the growth of crystals in situ. Commonly, the crystallization step will be carried out in two parts. Such involves initially heating the glass shape to a temperature within or somewhat above the transformation range thereof to cause the development of nuclei in the glass. After the nucleating step, the glass shape is heated to a higher temperature, commonly above the softening point thereof, to effect the growth of crystals on the nuclei.

Because the growth of crystals takes place on nuclei dispersed throughout the glass shape, a glass-ceramic will typically have a microstructure of fine-grained crystals randomly oriented, but uniformly dispersed, throughout a residual glassy matrix. In general, a glass-ceramic is predominantly crystalline, i.e., greater than 50% by volume crystalline, such that the physical and chemical properties exhibited thereby will be more comparable to the crystal phase present therein than to the properties of the original glass. Moreover, the composition of the small amount of residual glass will be quite different from that of the original glass inasmuch as the components making up the crystals will have been removed therefrom. Finally, because glass-ceramics are prepared via the crystallization in situ of glass articles, they will have smooth surfaces and be non-porous.

Anorthite, i.e., triclinic $CaO.Al_2O_3.2SiO_2$, has been known for its insulating properties. However, those properties are not sufficiently different from those of steatite and forsterite to warrant the added expense of manufacture. Nevertheless, it has been realized that a glass-ceramic body wherein the predominant and, preferably, the sole crystal phase is anorthite could have significant practical application. Such bodies would have high dielectric constants and D.C. volume resistivities coupled with low loss tangents and, consequently, would be competitive with commercial electrically-insulating materials. Because of their mode of manufacture, such bodies could be produced at a rapid rate and would have the advantages of smooth surfaces and no porosity.

Anorthite-containing glass-ceramics have been known to the art. For example, U.S. Pat. No. 2,920,971, supra, reports several exemplary compositions wherein the primary crystal phase is anorthite. Nevertheless, whereas bodies of fine-grained, well-crystallized microstructure have been prepared, such have commonly been plagued with a deleterious surface crystallization mechanism which causes a badly-distorted, wrinkled surface appearance. Close examination of this surface crystallization has frequently determined the presence of a high expansion, hexagonal feldspar form of $CaO.Al_2O_3.2SiO_2$ rather than the desired triclinic anorthite.

U.S. Pat. No. 3,531,303 describes the production of alkaline earth aluminosilicate glass-ceramic articles from widely-varying base compositions wherein a hexagonal alkaline earth feldspar constitutes the predominant crystal phase.

OBJECTIVES OF THE INVENTION

The principal objective of the instant invention is to provide glass-ceramic articles in which anorthite or an anorthite solid solution constitutes the predominant crystal phase and essentially the only silicate phase present. The articles are free from surface distortion and wrinkling, exhibit high D.C. volume resistivity and dielectric constants, and demonstrate low A.C. dielectric loss.

A second objective is to provide a method for making such articles.

SUMMARY OF THE INVENTION

I have found a limited range of compositions in the $CaO-Al_2O_3-SiO_2$ system nucleated with $TiO_2$ which can be heat treated in a defined manner to form glass-ceramic articles wherein anorthite or an anorthite solid solution is the predominant crystal phase present. Solid solution can be had with divalent metal oxides such as MgO, SrO, BaO, CdO, and PbO, which articles will exhibit physical properties modified from those of the simple anorthite assemblage. As used herein, the term anorthite will include both the classic ternary composition and a solid solution thereof. The articles of the invention are essentially free from surface distortion or wrinkling and exhibit high refractoriness, moderate coefficients of thermal expansion ($\sim 35$–$65 \times 10^{-7}/°C$. over the temperature range of 20°–300° C.), high dielectric constants, high D.C. volume resistivity, and low A.C. dielectric losses. Such articles are highly crystalline and can be formed from glasses having base compositions, expressed in weight percent on the oxide basis, of 10–18% CaO, 29–35% $Al_2O_3$, 30–39% $SiO_2$, and 13–20% $TiO_2$.

The formation of highly crystalline anorthite glass-ceramic articles necessitates that the precursor glass composition be maintained relatively close to the anorthite stoichiometry, especially with respect to the silica content for, unlike the well-known beta-quartz solid solution and beta-spodumene solid solution-containing glass-ceramic bodies, anorthite does not enter into solid solution with excess $SiO_2$. Excesses in $SiO_2$ level will yield incompletely crystallized, relatively glassy bodies. Nevertheless, as was observed above, anorthite does enter into solid solution with various divalent metal oxides. Examples of such in the indicated proportions are: up to 3% MgO, up to 10% SrO, up to 5% BaO, up to 7% PbO, and up to 5% CdO. Up to about 1.5% fluoride (F) and up to about 6% $P_2O_5$ may also be advantageously included, as will be explained below. However, the total of all additives will not exceed about 10% and will, most preferably, be less than 5%, if present at all.

Figure 1:
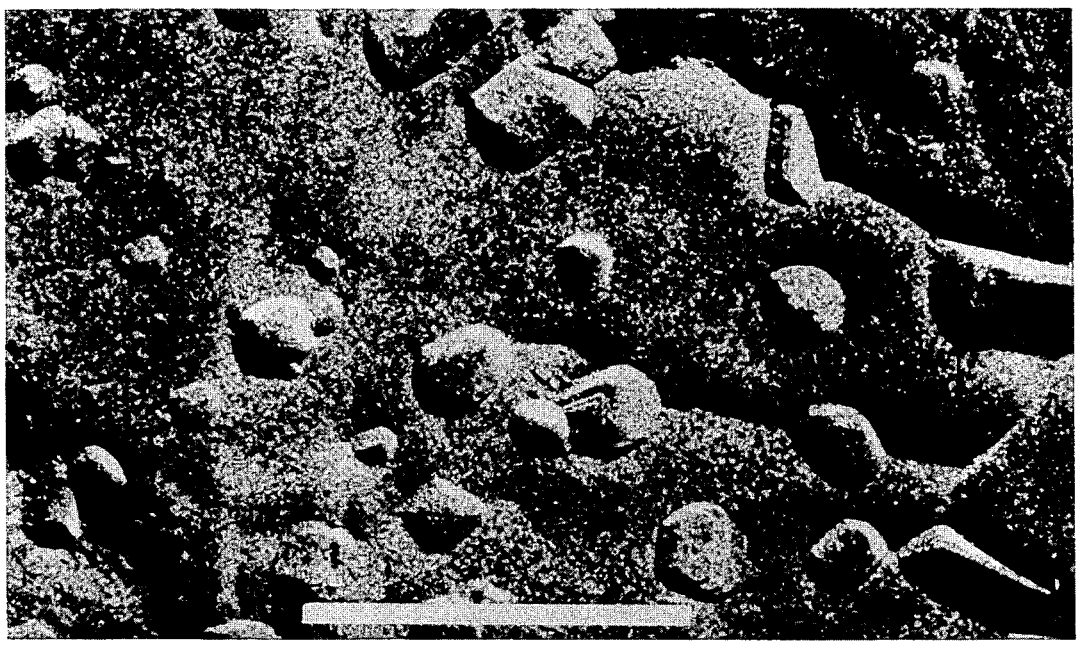
FIG. 1 is an electron micrograph of the surface crystallization present in a glass-ceramic article having a composition within the ranges specified and prepared in accordance with the method of the instant invention.
Figure 2:
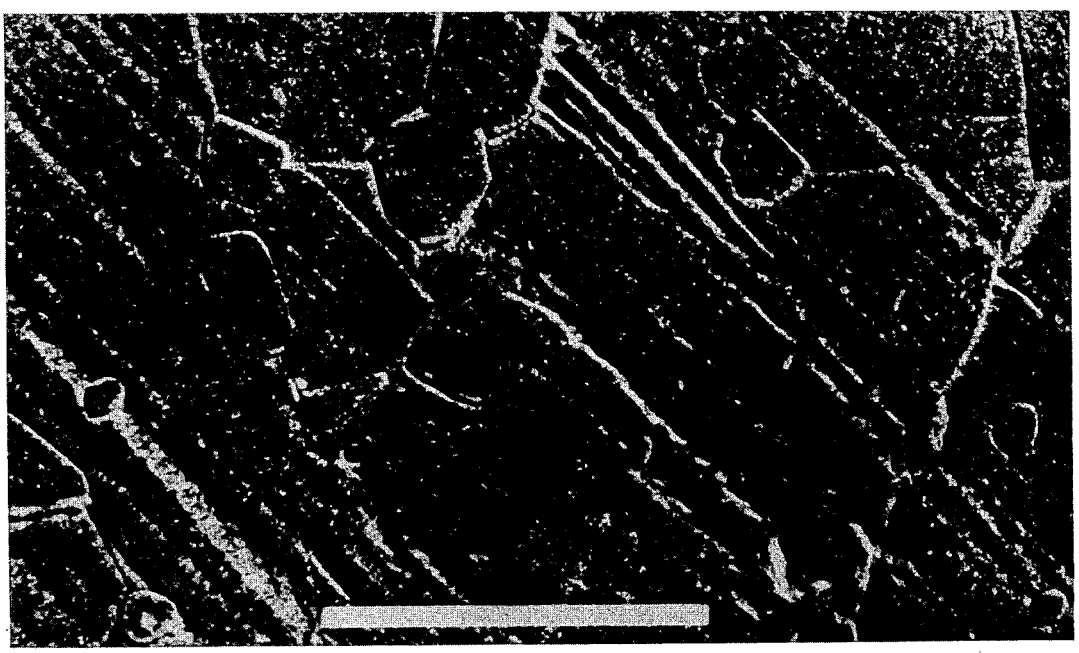
FIG. 2 is an electron micrograph of the interior crystallization present in a glass-ceramic article having a composition within the ranges specified and prepared in accordance with the method of the instant invention.

A vital feature of the instant invention is the nucleation species. Thus, high levels of $TiO_2$ are required. At a 13% by weight content of $TiO_2$, a fine-grained body can be produced but some surface distortion will persist unless an extended nucleation period is employed. At the 14% $TiO_2$ level and higher, highly crystallized bodies are developed with a uniform distribution of anorthite crystals having diameters of about 1–2 microns interspersed with tetragonal rutile ($TiO_2$) crystals having lengths up to about 0.6 micron. As is illustrated in FIGS. 1 and 2, the crystallization is uniform both in the surface and interior of the articles.

Laboratory experimentation has demonstrated that nucleation via a combination of $TiO_2+ZrO_2$ is relatively ineffective. For example, even at 12 mole percent $TiO_2$ and 3 mole percent $ZrO_2$, obvious coarsening of the microstructure is evident. Increasing the mole ratio $ZrO_2:TiO_2$ leads to the growth of even coarser crystals. Nucleation via $ZrO_2$ alone results in large visible crystals of orthorhombic $CaO.Al_2O_3.2SiO_2$ in a matrix of finer grained material.

The use of a combination of $MgO+TiO_2$ for nucleation, or attempting to enhance nucleation through the addition of small amounts of $Cr_2O_3$, has proven to be ineffective. For example, combinations of up to 6.5 mole percent MgO with up to 12 mole percent $TiO_2$ do not yield fine-grained bodies. The addition of as little as 0.2 mole percent $Cr_2O_3$ to an otherwise satisfactory composition results in a coarsened microstructure. Yet, $Cr_2O_3$ has been recognized as an effective nucleating agent with alkali metal-containing plagioclase-containing glass-ceramic articles U.S. Pat. No. 3,146,114). Plagioclase is a solid solution of albite, $Na_2O.Al_2O_3.6SiO_2$, and anorthite.

Also, no evidence of fine-grained crystal development has been found at $TiO_2$ concentrations lower than 13%. As observed above, U.S. Pat. No. 3,531,303 discloses the in situ crystallization of glasses in the CaO-SrO-BaO-$Al_2O_3$-$SiO_2$ composition field utilizing a variety of nucleating agents, but not including $TiO_2$. In all of the CaO-containing working examples reported therein, the hexagonal form of $CaO.Al_2O_3.2SiO_2$, rather than triclinic anorthite, is stated to be the predominant crystal phase present.

Although the highest surface gloss and the optimum resistance to surface cracking and wrinkling were observed where the mole ratio $Al_2O_3:CaO$ was greater than 1, but no greater than 1.1, good fine-grained articles can be prepared where the mole ratio $Al_2O_3:CaO$ ranges between about 0.9–1.6.

The process of the invention contemplates three general steps:

First, a glass-forming batch coming within the above-cited composition ranges is melted;

Second, the molten batch is simultaneously cooled to a temperature at least within the transformation range of the glass (optionally to room temperature) and a glass shape of a desired geometry shaped therefrom; and Third, the glass shape is heated to a temperature between about 1000°–1400° C. and maintained within that range for a sufficient length of time to cause the growth of anorthite crystals.

To insure the greatest uniformity of crystal size, the crystallization step will customarily be divided into two parts. Thus, the glass article will typically be heated to a temperature within and somewhat above the transformation range, e.g., between about 750°–900° C., and held within that range of temperatures for about 3–8 hours to foster good nucleation, after which the temperature is raised to between 1000°–1400° C. and maintained within that range of temperatures for about 4–10 hours to cause the growth of crystals on the nuclei.

It will be appreciated that the rate of in situ crystal growth is dependent upon the temperature at which the crystallization is carried out, the rate being more rapid at higher temperatures. Consequently, whereas a time of only about one hour may be sufficient at the higher extreme of the crystallization range, 24 hours and longer may be required at temperatures around 1000° C. to achieve high crystallinity. The use of dwell periods at specific temperatures is a matter of convenience only. All that is required is the maintenance of the glass within the range of crystallization temperatures for a period of time sufficient to induce crystal growth.

DETAILED DESCRIPTION

Table I records several glass batches, expressed in parts by weight on the oxide basis, illustrating the compositional parameters of the instant invention. Since the sum of the individual ingredients totals or approximately totals 100, for practical purposes the batches may be considered to be expressed in weight percent. Inasmuch as it is not known with which cation the fluoride is combined, it is simply reported as $CaF_2$, the batch ingredient through which the fluoride was incorporated into the glass. The actual batch constituents may comprise any materials, either the oxides or other compounds, which, upon being melted together, will be converted to the desired oxide in the proper proportion.

The batch ingredients for each of the exemplary compositions were compounded in the proper proportions to yield about 800 grams of material, the material ball-milled together to assist in obtaining a homogeneous melt, the batch then deposited into a platinum crucible, the crucible covered, and the crucible placed into a furnace operating at 1650° C. At the conclusion of a 16-hour melting period, each fluid melt was poured several times back-and-fourth from one crucible to an empty crucible to minimize inhomogeneities in the melt. Thereafter, each molten glass was poured onto a steel plate to form a slab about $\frac{1}{4}''\times 4''\times 10''$ and the glass slab immediately transferred to an annealer operating at about 500°–750° C. $As_2O_3$ was included in some batches to perform its conventional function as a fining agent.

TABLE I

| | 1 | 2 | 3 | 4 | 5 | 6 | 7 | 8 | 9 | 10 |
|---|---|---|---|---|---|---|---|---|---|---|
| SiO₂ | 37.5 | 37.1 | 36.7 | 36.8 | 36.6 | 36.7 | 36.5 | 36.4 | 36.2 | 35.1 |
| Al₂O₃ | 32.2 | 32.1 | 31.1 | 31.5 | 31.4 | 31.8 | 32.2 | 33.4 | 34.4 | 32.9 |
| CaO | 17.3 | 17.0 | 17.1 | 17.0 | 16.9 | 16.8 | 16.3 | 15.6 | 14.9 | 17.4 |
| TiO₂ | 13.0 | 13.8 | 14.6 | 14.7 | 14.6 | 14.7 | 14.6 | 14.5 | 14.5 | 14.6 |
| As₂O₃ | — | — | 0.5 | — | 0.5 | — | 0.5 | — | — | — |

| | 11 | 12 | 13 | 14 | 15 | 16 | 17 | 18 | 19 | 20 |
|---|---|---|---|---|---|---|---|---|---|---|
| SiO₂ | 38.4 | 36.1 | 36.7 | 36.8 | 37.1 | 36.1 | 34.6 | 35.8 | 34.1 | 35.1 |
| Al₂O₃ | 30.7 | 30.0 | 31.5 | 31.5 | 32.1 | 30.9 | 30.9 | 30.6 | 30.5 | 30.4 |
| CaO | 16.2 | 16.7 | 16.3 | 15.3 | 13.5 | 15.0 | 14.3 | 13.2 | 12.4 | 10.8 |
| TiO₂ | 14.7 | 16.3 | 14.6 | 14.7 | 14.8 | 14.4 | 14.4 | 14.3 | 14.2 | 14.0 |
| As₂O₃ | — | — | — | 0.5 | — | 0.5 | — | — | — | — |
| CaF₂ | — | — | 1.0 | — | — | — | 0.9 | — | 0.9 | — |
| P₂O₅ | — | — | — | — | — | — | 1.7 | — | 1.7 | — |
| MgO | — | — | — | 1.2 | 2.5 | — | — | — | — | — |
| SrO | — | — | — | — | — | 3.1 | 3.1 | 6.2 | 6.1 | 9.7 |

| | 21 | 22 | 23 | 24 | 25 | 26 | 27 | 28 | 29 |
|---|---|---|---|---|---|---|---|---|---|
| SiO₂ | 35.6 | 34.1 | 34.8 | 36.2 | 34.5 | 35.01 | 36.47 | 34.92 | 33.24 |
| Al₂O₃ | 30.5 | 30.5 | 29.9 | 31.0 | 29.8 | 31.26 | 31.26 | 31.17 | 29.67 |
| CaO | 14.8 | 14.1 | 14.5 | 15.0 | 12.6 | 16.85 | 16.17 | 16.13 | 13.74 |
| TiO₂ | 14.2 | 14.2 | 13.9 | 14.4 | 13.8 | 14.55 | 14.55 | 14.51 | 13.81 |
| As₂O₃ | 0.5 | — | 0.5 | 0.5 | — | 0.60 | 0.60 | 0.60 | 0.57 |
| CaF₂ | — | 0.9 | — | — | — | — | 0.95 | 0.95 | 0.90 |
| P₂O₅ | — | 1.7 | — | — | — | 1.72 | — | 1.72 | 1.64 |
| MgO | — | — | — | 0.6 | — | — | — | — | — |
| SrO | — | — | — | — | 3.0 | — | — | — | — |
| BaO | 4.5 | 4.5 | — | 2.3 | — | — | — | — | — |
| PbO | — | — | 6.5 | — | 6.4 | — | — | — | 6.43 |

| | 30 | 31 | 32 | 33 | 34 | 35 |
|---|---|---|---|---|---|---|
| SiO₂ | 36.2 | 33.4 | 31.9 | 33.6 | 31.8 | 35.0 |
| Al₂O₃ | 31.4 | 31.4 | 31.4 | 31.6 | 29.9 | 30.3 |
| CaO | 14.5 | 16.6 | 16.6 | 15.0 | 14.2 | 16.0 |
| TiO₂ | 14.5 | 14.5 | 14.5 | 14.6 | 13.8 | 18.6 |
| As₂O₃ | 0.6 | 0.6 | 0.6 | 0.6 | 0.6 | — |
| CaF₂ | 2.8 | — | — | — | — | — |
| P₂O₅ | — | 3.4 | 5.1 | 3.5 | 3.3 | — |
| MgO | — | — | — | 1.2 | — | — |
| PbO | — | — | — | — | 6.4 | — |

Specimens of appropriate dimensions for obtaining physical and electrical property measurements were cut from the above slabs. Table II records five different heat treatments applied to the test specimens and the remainders of the slabs formed from the compositions of Table I. It will be recognized that those heat treatment schedules are illustrative only and not limitative. Hence, as was discussed above, crystallization of the glass body proceeds more rapidly as the temperature thereof is raised. Typically, the glass body will be raised to a temperature above its softening point to promote crystal growth. However, as the temperature approaches and exceeds the softening point, the glass body will tend to deform. Accordingly, a balance must be struck between the rate of temperature increase and the rate at which crystals are developing within the glass. Therefore, in the first stages of crystallization, the proportion of crystals to glassy matrix is quite low so deformation of the glass can readily occur as the softening point of the glass is approached. Where speed in crystallizing the glass is important, formers or other physical support means for the glass can be utilized to reduce this effect. The use of a substantial nucleation period engenders more rapid and uniformly-sized crystal growth.

In summary, the rate at which the temperature is increased will, preferably, equal the rate at which crystals are developing within the glass with the required degree of fluidity in the residual glass to preclude excessive stress buildup and cracking. A heating rate of up to about 200° C./hour from the nucleation range into the crystallization range has resulted in sound, essentially deformation-free articles in most instances without the use of formers.

The rate at which the crystallized body can be cooled to room temperature after the heat treatment step is dependent upon its coefficient of thermal expansion and its thickness dimension. Inasmuch as the glass-ceramics of the present invention have coefficients of thermal expansion over the temperature range of 20°–300° C. between about $35-65 \times 10^{-7}/°C.$, thin-walled articles thereof can be merely removed from the furnace into the ambient environment. However, in the interest of convenience, the crystallized bodies of the compositions reported in Table I were simply left in the furnace and allowed to cool to room temperature (R.T.) at furnace rate, estimated to be about 3°–5° C./minute.

TABLE II

| Schedule No. | Heat Treatment |
|---|---|
| A | R.T. to 800° C. at 200°C./hour |
| | 800° C. to 900° C. at 20° C./hour |
| | 900° C. to 1100° C. at 100° C./hour |
| | Hold at 1100° C. for 4 hours |
| B | R.T. to 800° C. at 300° C./hour |
| | 800° C. to 900° C. at 12.5° C./hour |
| | 900° C. to 1250° C. at 200° C./hour |
| | Hold at 1250° C. for 4 hours |
| C | R.T. to 800° C. at 300° C./hour |
| | 800° C. to 900° C. at 20° C./hour |
| | 900° C. to 1250° C. at 200° C./hour |
| | Hold at 1250° C. for 6 hours |
| D | R.T. to 800° C. at 200° C./hour |
| | 800° C. to 900° C. at 20° C./hour |
| | 900° C. to 1300° C. at 100° C./hour |
| | Hold at 1300° C. for 4 hours |

TABLE II-continued

| Schedule No. | Heat Treatment |
| --- | --- |
| E | R.T. to 800° C. at 300° C./hour |
| | 800° C. to 950° C. at 30° C./hour |
| | 950° C. to 1300° C. at 200° C./hour |
| | Hold at 1300° C. for 6 hours |

Table III reports the heat treatment schedule(s) applied to the glass specimens of Table I along with a description of the visual appearance of each crystallized product, the crystal phases found in the specimens in the order of amount present as identified through X-ray diffraction analysis, and the coefficient of thermal expansion ($\times 10^{-7}$/°C.) over the ranges of 20°–300° C. and 20°–1000° C., as measured in the conventional manner utilizing a differential dilatometer. Inasmuch as the X-ray diffraction pattern observed of the ternary anorthite compositions is quite similar to that displayed where solid solution has occurred, although the d-spacings and intensities may vary somewhat, as a matter of convenience the term "anorthite" is employed in the table to cover both types of crystals.

Table III

| Example No. | Heat Treatment Schedule | Visual Appearance | Crystal Phase | Coefficient of Expansion 20°–300° | Coefficient of Expansion 20°–1000° |
| --- | --- | --- | --- | --- | --- |
| 1 | D | Wrinkled white surface on medium-grained white interior | Hexagonal $CaO.Al_2O_3.2SiO_2$ Anorthite, Rutile | — | — |
| 1 | B | Slightly wrinkled white surface on fine-grained white interior | Anorthite, Rutile, Hexagonal $CaO.Al_2O_3.2SiO_2$ (?) | — | — |
| 2 | D | Glossy cream surface on fine-grained white interior | Anorthite, Rutile | — | ' |
| 2 | B | Glossy cream surface on fine-grained white interior | " | 52 | 55 |
| 3 | A | Dull white surface on fine-grained white interior | " | — | — |
| 3 | D | Dull white surface on fine-grained white interior | " | 51 | 51 |
| 4 | A | Glossy off-white surface on fine-grained white interior | " | 42 | 45 |
| 4 | B | Glossy cream surface on very fine-grained white interior | " | 46 | 56 |
| 4 | C | Glossy off-white surface on fine-grained white interior | " | 57 | 47 |
| 5 | A | Glossy white surface on fine-grained white interior | " | — | — |
| 5 | D | Glossy white surface on fine-grained white interior | " | 53 | 53 |
| 6 | B | Glossy white surface on fine-grained white interior | " | 52 | 58 |
| 6 | E | Glossy white surface on fine-grained white interior | " | 48 | 52 |
| 7 | A | Glossy white surface on fine-grained white interior | " | — | — |
| 7 | D | Glossy white surface on fine-grained white interior | " | 48 | 52 |
| 8 | B | Semi-glossy cream surface on medium fine-grained white interior | Anorthite, Rutile Mullite (?) | 49 | 56 |
| 9 | B | Semi-glossy cream surface on medium-grained white interior | Anorthite, Rutile, Mullite (?) | 43 | 51 |
| 10 | D | Dull cream surface on medium fine-grained white interior | Anorthite, Rutile | 53 | 54 |
| 11 | D | Dull cream surface on medium fine-grained white interior | " | 44 | 53 |
| 12 | C | Glossy cream surface on fine-grained white interior | " | 51 | 53 |
| 13 | C | Dull yellow-white surface on fine-grained white interior | " | 62 | 66 |
| 14 | D | Dull cream surface on very fine-grained white interior | " | 46 | 54 |
| 15 | D | Dull cream surface on medium fine-grained white interior | " | 44 | 53 |
| 16 | D | Glossy white surface on fine-grained white interior | " | 53 | 54 |
| 17 | D | Glosssy white surface on fine-grained gray interior | " | 52 | 55 |
| 18 | C | Glossy white surface on fine-grained white interior | " | 38 | 51 |
| 18 | D | Glossy white surface on fine-grained white interior | " | 42 | 50 |
| 19 | D | Dull cream surface on fine-grained white interior | " | 46 | 53 |
| 20 | D | Glossy off-white surface on fine-grained white interior | " | 38 | 50 |
| 21 | D | Dull of-white surface on fine-grained white interior | Anorthite, Rutile, Celsian (?) | 49 | 52 |
| 22 | D | Dull off-white surface on fine-grained gray interior | Anorthite, Rutile | 51 | 56 |
| 23 | D | Dull off-white surface on fine-grained white interior | " | 45 | 52 |

Table III-continued

| Example No. | Heat Treatment Schedule | Visual Appearance | Crystal Phase | Coefficient of Expansion 20°-300° | Coefficient of Expansion 20°-1000° |
|---|---|---|---|---|---|
| 24 | D | Dull off white surface on fine-grained on white interior | " | 51 | 59 |
| 25 | D | Semi-glossy cream surface on medium fine-grained white interior | " | 45 | 52 |
| 26 | A | Glossy white surface on fine-grained white interior | " | — | — |
| 26 | D | Dull off-white surface on fine-grained white interior | " | 55 | 57 |
| 27 | A | Glossy white surface on fine-grained white interior | " | — | — |
| 27 | D | Dull off-white surface on fine-grained white interior | " | 57 | 56 |
| 28 | A | Glossy white surface on fine-grained white interior | " | — | — |
| 28 | D | Dull off-white surface on fine-grained white interior | " | 58 | 56 |
| 29 | A | Dull white surface on medium fine-grained white interior | " | — | — |
| 30 | A | Dull white surface on fine-grianed white interior | " | 60 | 58 |
| 31 | A | Semi-glossy, off-white surface on medium fine-grained white interior | " | — | — |
| 32 | A | Semi-glossy off-white surface on medium fine-grained white interior | " | — | — |
| 33 | A | Semi-glossy off-white surface on | " | — | — |
| 34 | A | Semi-glossy off-white surface on | " | — | — |
| 35 | D | Dull yellow-white surface on fine-grained yellow-white interior | " | 41 | 49 |

The presence of the (?) in Table III indicates a possible trace amount of the recorded crystal phase.

Several factors become clear from an examination of Table III in conjunction with Table I. For example, except for possible trace amounts of mullite, $3Al_2O_3 \cdot 2SiO_2$, in the high alumina-containing Examples 8 and 9, and possible trace amounts of celsian, $BaO \cdot Al_2O_3 \cdot 2SiO_2$, in Example 21, all the acceptable glass-ceramic products exhibited anorthite as the very predominant crystal phase with a minor rutile phase distributed through the surface and the interior. The surface hexagonal structure $CaO \cdot Al_2O_3 \cdot 2SiO_2$ shown in Example 1 has been discussed above. Example 15 illustrates a definite coarsening of the microstructure as MgO is added to the base composition but X-ray diffraction analysis did not indicate the presence of cordierite, $2MgO \cdot 2Al_2O_3 \cdot 5SiO_2$. Additions of $P_2O_5$ also seem to cause a coarsening of crystal size as is seen in Examples 29 and 31–33. The addition of BaO does not appear to have a severely deleterious effect upon the grain size of the microstructure, but does lead to the growth of celsian. Example 20 demonstrates that rather substantial quantities of SrO can be included in the precursor composition without introducing new crystal phases into the product, although the intensities of several of the anorthite X-ray diffraction lines evidenced intensity changes, thereby indicating alterations in the unit cells as an anorthite solid solution crystal is formed. Such changes are postulated to result from heavier $Sr^{+2}$ ions occupying positions normally filled by $Ca^{+2}$ ions. Continued additions of PbO have led to the growth of a new crystal phase, tentatively identified as a lead titanosilicate.

FIGS. 1 and 2 manifest the uniformity of crystallization throughout the inventive glass-ceramics. Thus, FIG. 1 is a replica electron micrograph illustrating the microstructure of the surface of Example 6 subjected to heat treatment schedule E. FIG. 2 is a replica electron micrograph of the interior portion of Example 6 exposed to heat treatment schedule E. Both micrographs exhibit the very highly crystalline character of the inventive products. In each, anorthite crystals of about 1–2 microns diameter comprise the background crystallization with smaller rutile crystals randomly dispersed throughout.

An extensive recitation of physical properties measured in accordance with methods conventional to the art for an anorthite-containing glass-ceramic (Example 6 subjected to heat treatment schedule E) and for an anorthite SrO solid solution-containing glass-ceramic (Example 18 after exposure to heat treatment schedule C) is provided in Table IV. The high temperatures of the "apparent anneal point" and "apparent strain point" strongly attest to the refractory nature of the inventive glass-ceramics.

TABLE IV

| Example | 6 | 18 |
|---|---|---|
| Knoop Hardness | 586 | 609 |
| Modulus of Rupture (abraded) | 16,700 psi | — |
| Apparent Anneal Point, Log$\eta$ (Poises) = 13.4 | 1300° C. | 1292° C. |
| Apparent Strain Point, Log$\eta$ (Poises) = 14.6 | 1246° C. | 1231° C. |
| Coefficient of Expansion, | | |
| 20°–300° C. | 48 | 38 |
| 20°–600° C. | 51 | 45 |
| 20°–1000° C. | 52 | 51 |
| 20°–1200° C. | 53 | — |
| Density, g/cm$^3$ | 2.908 | 2.965 |
| Young's Modulus | $16.0 \times 10^6$ psi | $14.9 \times 10^6$ psi |
| Bulk Modulus | $6.2 \times 10^6$ psi | $5.7 \times 10^6$ psi |
| Poisson's Ratio | 0.30 | 0.31 |
| Thermal Conductivity, $\frac{cal - cm}{cm^2 - sec - °C.}$ | 0.0044 | 0.0050 |

Table V records a number of electrical property measurements performed in the conventional manner upon several of the crystallized Examples of Table I. For comparison purposes, corresponding properties of commercially-available ceramic materials marketed for their useful electrical properties are also reported. These latter values were obtained from the text *Glass-Ceramics*, pages 161 and 166, authored by P. W. Mac- Millan and published by Academic Press in 1964. In the Table, log $\rho$ represents D.C. volume resistivity, K signifies dielectric constant, tan $\delta$ designates loss tangent, and Ktan $\delta$ indicates dielectric loss factor.

of PbO in such compositions appears to exert a significant effect upon those properties resulting in products manifesting dielectric constants of intermediate values accompanied with lower loss tangents. This phenome-

TABLE V

| Example No. | Heat treatment Schedule | Log$\rho$ 250° C. | Log$\rho$ 350° C. | $10^5$ Hz K | $10^5$ Hz tan$\delta$ | $10^6$ HZ K | $10^6$ HZ tan$\delta$ | $10^6$ HZ Ktan$\delta$ |
|---|---|---|---|---|---|---|---|---|
| 3 | D | 14.4 | 12.0 | 10.1 | 0.0031 | 9.7 | 0.00009 | 0.00087 |
| 6 | E | 15.3 | 12.6 | 11.9 | 0.025 | 12.1 | 0.027 | 0.3267 |
| 7 | D | 13.7 | 11.1 | 10.9 | 0.0064 | 10.3 | 0.00009 | 0.00093 |
| 14 | D | 14.3 | 11.4 | 10.9 | 0.0001 | 10.9 | 0.00019 | 0.0021 |
| 16 | D | 13.2 | 11.4 | 11.0 | <0.0001 | 11.3 | 0.0004 | 0.0045 |
| 17 | D | 10.6 | 8.9 | 28.0 | 0.12 | — | — | — |
| 18 | D | 15.6 | 13.0 | 11.0 | 0.024 | 10.6 | 0.0044 | 0.04664 |
| 19 | D | 11.0 | 9.3 | 14.2 | 0.13 | — | — | — |
| 21 | D | 13.1 | 11.3 | 11.1 | 0.0001 | — | — | — |
| 22 | D | 12.1 | 10.3 | 14.0 | 0.15 | — | — | — |
| 23 | D | 13.3 | 11.0 | 11.6 | <0.0001 | — | — | — |
| 24 | D | 13.3 | 11.5 | 11.2 | <0.0001 | 11.6 | 0.0003 | 0.0035 |
| 26 | A | 11.7 | 9.8 | 11.8 | <0.0001 | 11.58 | 0.0001 | 0.00116 |
| 26 | D | 15.1 | 12.7 | 10.9 | <0.0001 | 11.0 | 0.0001 | 0.0011 |
| 27 | A | 11.8 | 10.1 | 10.7 | <0.0001 | 11.3 | −0.0001 | <0.00113 |
| 27 | D | 12.2 | 10.4 | 11.0 | <0.0001 | 10.0 | <0.0001 | <0.0010 |
| 28 | A | 12.1 | 10.4 | 11.9 | 0.035 | 11.4 | 0.0080 | 0.0912 |
| 28 | D | 12.3 | 10.4 | 10.9 | 0.022 | 10.7 | 0.0054 | 0.05778 |
| 29 | A | 11.6 | 10.0 | 12.1 | 0.0084 | 12.2 | 0.0013 | 0.01586 |
| 30 | A | 12.5 | 10.4 | 11.4 | <0.0001 | 11.2 | 0.00006 | 0.00067 |
| 31 | A | 13.1 | 10.6 | 12.1 | <0.0001 | 12.1 | <0.0001 | <0.0012 |
| 32 | A | 12.9 | 10.3 | 11.9 | <0.0001 | 11.8 | <0.0001 | <0.0012 |
| 33 | A | 12.4 | 10.1 | 11.4 | <0.0001 | 11.4 | <0.0001 | <0.0011 |
| 34 | A | 13.1 | 10.4 | 12.8 | <0.0001 | 12.8 | <0.0001 | <0.0013 |
| 95% Al$_2$O$_3$ | — | 10.6 | 9.5 | — | — | 8.8 | 0.0004 | 0.0035 |
| Steatite | — | — | — | — | — | 5.9 | 0.0013 | 0.0077 |
| Forsterite | — | — | — | — | — | 6.3 | 0.0003 | 0.0019 |

As is readily apparent from Table V, all of the anorthite-containing, alkali metal-free glass-ceramic bodies demonstrate exceptionally high D.C. volume resistivities, viz., Log $\rho$ at 250° C. of about 10–16 and Log $\rho$ at 350° C. of about 9–13. Although their dielectric constants (~10–13 at $10^5$ Hz and ~9–13 at $10^6$ Hz) are somewhat higher than values typically associated with A.C. insulator applications, the extremely low loss tangents exhibited by several of the Examples from Table I result in dielectric loss factors which are quite competitive with the listed values for commercial ceramic materials. The preferred products exhibit a tan $\delta$ at 25° C. and $10^5$ Hz of $\leq 0.001$. It is of interest to note that the inclusion of fluoride alone (Examples 27 and 30) or P$_2$O$_5$ alone (Examples 26, 31, and 32) appeared to yield quite low loss tangents, whereas a combination of the two caused a sharp increase in the loss tangent (Example 28). Example 29 illustrates that the addition of PbO can reduce this increase in loss tangent. In any event, fluoride is a very strong flux and P$_2$O$_5$ is a glass-forming ingredient so, therefore, the amount of each that will desirably be present is strictly limited. Accordingly, fluoride will be limited to a total of about 1.5% and P$_2$O$_5$ will be restricted to a maximum of about 6%.

It is of interest to observe (Examples 17, 19, and 22) that the additions of the alkaline earth metal oxides SrO and BaO to the base compositions containing P$_2$O$_5$ and fluoride can lead to abnormally high dielectric constants. However, being coupled with high loss tangents, the materials are of little value. However, the inclusion non enables controlled variations in dielectric constant without hazarding a high loss tangent.

I claim:

1. A glass-ceramic article exhibiting a Log $\rho$ at 250° C. of about 10–16, a Log $\rho$ at 350° C. of about 9–13, a dielectric constant at $10^5$ Hz of about 10–13, a dielectric constant at $10^6$ Hz of about 9–13, and a coefficient of thermal expansion over the range 20°–300° C. of about 35–65 $\times 10^{-7}$/°C. consisting essentially of a fine-grained crystal phase uniformly dispersed within a glassy matrix and constituting greater than 50% by volume of the article, said crystal phase consisting essentially of triclinic anorthite and rutile and being formed through crystallization in situ from a glass body consisting essentially, expressed in weight percent on the oxide basis, of about 10–18% CaO, 29–35% Al$_2$O$_3$, 30–39% SiO$_2$, and 13–20% TiO$_2$.

2. A glass-ceramic article according to claim 1 wherein the mole ratio Al$_2$O$_3$:CaO ranges between about 0.9–1.6.

3. A glass-ceramic article according to claim 2 wherein the mole ratio Al$_2$O$_3$:CaO is greater than 1 but no greater than 1.1.

4. A glass-ceramic article according to claim 1 wherein said glass body also contains up to 3% MgO, up to 10% SrO, up to 5% BaO, up to 7% PbO, up to 5% CdO, up to 6% P$_2$O$_5$, and up to 1.5% F, the total of all such components not exceeding about 10%.

* * * * *

UNITED STATES PATENT AND TRADEMARK OFFICE
CERTIFICATE OF CORRECTION

PATENT NO. : 4,187.115

DATED : February 5, 1980

INVENTOR(S) : Richard F. Reade

It is certified that error appears in the above–identified patent and that said Letters Patent are hereby corrected as shown below:

Column 5, line 9 of Table I, and second line under Example 12, change "30.0" to --30.9--.

Column 9, in Table III-Continued and under Visual Appearance for Example 30, change "fine-grianed" to --fine-grained--.

Column 9, in Table III-Continued and under Visual Appearance for Example 33, directly under "Semi-glossy off-white surface on" add --medium fine-grained white interior--.

Column 9, in Table III-Continued and under Visual Appearance for Example 34, directly under "Semi-glossy off-white surface on" add --medium fine-grained white interior--.

Column 11, in Table V, the columns of figures under "$10^5$ Hz and tan$\delta$" and "$10^6$ Hz and K" have been run together and should read as follows:

| Example No. | $10^5$ Hz tan$\delta$ | $10^6$ Hz K |
|---|---|---|
| 3 | 0.0031 | 9.7 |
| 6 | 0.025 | 12.1 |
| 7 | 0.0064 | 10.3 |
| 14 | 0.0001 | 10.9 |
| 16 | <0.0001 | 11.3 |
| 17 | 0.12 | - |
| 18 | 0.024 | 10.6 |
| 19 | 0.13 | - |
| 21 | 0.0001 | - |
| 22 | 0.15 | - |

UNITED STATES PATENT AND TRADEMARK OFFICE
CERTIFICATE OF CORRECTION

PATENT NO. : 4,187,115

DATED : February 5, 1980

INVENTOR(S) : Richard F. Reade

It is certified that error appears in the above-identified patent and that said Letters Patent are hereby corrected as shown below:

| Example No. | $10^5$ Hz tan$\delta$ | $10^6$ K |
|---|---|---|
| 23 | <0.0001 | – |
| 24 | <0.0001 | 11.6 |
| 26 | <0.0001 | 11.58 |
| 26 | <0.0001 | 11.0 |
| 27 | <0.0001 | 11.3 |
| 27 | <0.0001 | 10.0 |
| 28 | 0.035 | 11.4 |
| 28 | 0.022 | 10.7 |
| 29 | 0.0084 | 12.2 |
| 30 | <0.0001 | 11.2 |
| 31 | <0.0001 | 12.1 |
| 32 | <0.0001 | 11.8 |
| 33 | <0.0001 | 11.4 |
| 34 | <0.0001 | 12.8 |
| 95% $Al_2O_3$ | – | 8.8 |
| Steatite | – | 5.9 |
| Forsterite | – | 6.3 |

UNITED STATES PATENT AND TRADEMARK OFFICE
CERTIFICATE OF CORRECTION

PATENT NO. : 4,187,115

DATED : February 5, 1980

INVENTOR(S) : Richard F. Reade

It is certified that error appears in the above–identified patent and that said Letters Patent are hereby corrected as shown below:

Column 11, in Table V, under $10^6$ Hz and $\tan\delta$ for Example 27 (Heat treatment Schedule A) change "-0.0001" to -- <0.0001 --.

Signed and Sealed this

Twenty-eighth Day of October 1980

[SEAL]

Attest:

SIDNEY A. DIAMOND

Attesting Officer

Commissioner of Patents and Trademarks